(12) United States Patent
Katayama et al.

(10) Patent No.: US 8,402,935 B2
(45) Date of Patent: Mar. 26, 2013

(54) ENGINE STARTING CONTROL APPARATUS

(75) Inventors: Takatsugu Katayama, Isehara (JP); Masahiko Yuya, Yokohama (JP); Naoki Osada, Sagamihara (JP); Atsushi Mitsuhori, Hiratsuka (JP); Hatsuki Morinaga, Isehara (JP); Makoto Shoji, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/416,134

(22) Filed: Mar. 9, 2012

(65) Prior Publication Data
US 2012/0160201 A1 Jun. 28, 2012

Related U.S. Application Data

(63) Continuation of application No. 11/969,951, filed on Jan. 7, 2008.

(30) Foreign Application Priority Data

Jan. 15, 2007 (JP) ................................. 2007-005947

(51) Int. Cl.
*F02N 11/08* (2006.01)
(52) U.S. Cl. ................................... 123/179.3
(58) Field of Classification Search ............... 123/90.15, 123/90.17, 179.3, 320, 321, 322, 179.18, 123/179.25, 179.28, 347, 348; 701/113
See application file for complete search history.

(56) References Cited

U.S. PATENT DOCUMENTS

| 6,668,548 | B1 * | 12/2003 | Asanuma et al. ............... 60/286 |
| 2001/0022166 | A1 | 9/2001 | Yamaguchi et al. |
| 2001/0051098 | A1 * | 12/2001 | Kenney et al. ............. 417/410.1 |
| 2005/0087169 | A1 * | 4/2005 | Yoshida et al. ............... 123/299 |
| 2005/0139183 | A1 * | 6/2005 | Nohara et al. ........... 123/179.18 |
| 2006/0048737 | A1 * | 3/2006 | Yoshihara ................... 123/182.1 |

FOREIGN PATENT DOCUMENTS

| JP | 2002-047953 | 2/2002 |
| JP | 2003-343308 | 12/2003 |
| JP | 2005-240768 | 9/2005 |

OTHER PUBLICATIONS

The Japanese Office Action of corresponding Japanese Application No. 2007-005947, dated Aug. 20, 2010 and mailed Aug. 24, 2010.

* cited by examiner

*Primary Examiner* — Stephen K Cronin
*Assistant Examiner* — Sizo Vilakazi
(74) *Attorney, Agent, or Firm* — Global IP Counselors, LLP

(57) ABSTRACT

An engine starting control apparatus is basically provided with a motor control section, a valve timing control section and a start control section. The motor control section is configured to operate an electric motor to crank an engine with an output of the electric motor being adjustable. The valve timing control section is configured to operate a variable valve operating mechanism when the engine is started to change at least a close timing of an intake valve of the engine from an initial timing to a start timing such that the start timing is set closer to an intake bottom dead center during a single engine start as compared to the initial timing. The start control section is configured to adjust the output of the electric motor as the close timing of the intake valve changes from the initial timing to the start timing during the single engine start.

15 Claims, 6 Drawing Sheets

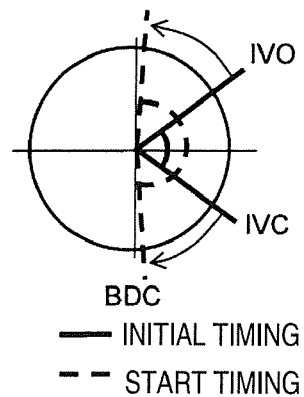
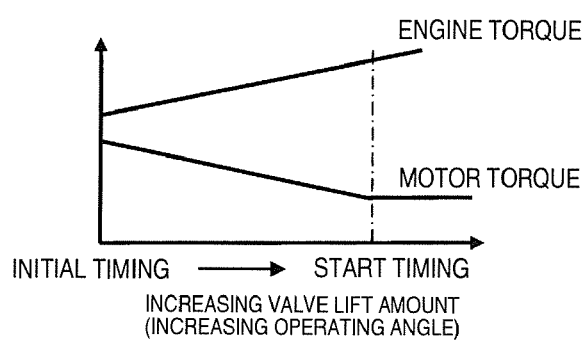
FIG. 9A                FIG. 9B
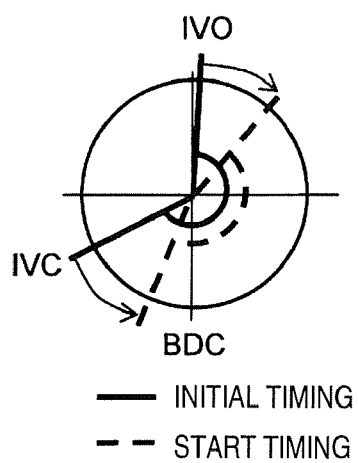
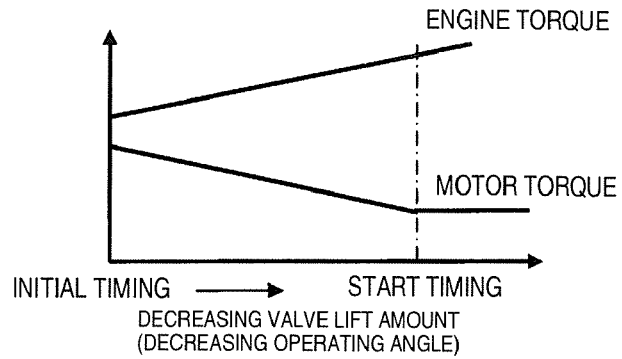
FIG. 10A               FIG. 10B

ENGINE STARTING CONTROL APPARATUS

CROSS-REFERENCE TO RELATED APPLICATIONS

This application is a continuation application of U.S. patent application Ser. No. 11/969,951 filed on Jan. 7, 2008, now pending. The entire disclosure of U.S. patent application Ser. No. 11/969,951 is hereby incorporated herein by reference. This application claims priority to Japanese Patent Application No. 2007-005947, filed on Jan. 15, 2007. The entire disclosure of Japanese Patent Application No. 2007-005947 is hereby incorporated herein by reference.

BACKGROUND OF THE INVENTION

1. Field of the Invention

The present invention relates to an engine starting control apparatus. More particularly, the present invention relates to an engine starting control apparatus that suppresses consumption of an electric power by an electric motor used to crank an engine when the engine is started.

2. Background Information

In a conventional engine starting system, an electric motor is operated to crank the engine when the engine is started. One example of such a conventional engine starting system is disclosed in Japanese Laid-Open Patent Publication No. 2005-240768. In this publication, the starting performance of an engine is improved by controlling the valve timing to a timing suitable for starting the engine (hereinafter called the "start timing"). With the engine starting system disclosed in this publication, when the engine is started, the valve timing is controlled to the start timing and fuel is prohibited from being supplied to the engine until the start timing is attained.

In view of the above, it will be apparent to those skilled in the art from this disclosure that there exists a need for an improved engine starting control apparatus. This invention addresses this need in the art as well as other needs, which will become apparent to those skilled in the art from this disclosure.

SUMMARY OF THE INVENTION

With the conventional engine starting system described in the above-mentioned publication, the engine is cranked solely by the electric motor during the period prior to when the valve timing reaches the start timing, i.e., during the period when the valve timing is changing. Consequently, the battery consumption (electric power consumption) of the electric motor is inevitably larger during such period. Moreover, since friction increases at lower temperatures, the battery consumption of the electric motor is even larger and there is the possibility that the battery power will become insufficient when the temperature is low.

The present invention was conceived in view of the problem described above regarding the battery power. One object is to provide an engine starting control apparatus that controls at least a close timing of an intake valve of an engine to a prescribed close timing that is suitable for starting the engine when the engine is started, and to effectively curb the electric power consumption (battery consumption) of an electric motor during starting while still ensuring good starting performance.

In order to achieve the above object of the present invention, an engine starting control apparatus basically comprises a motor control section, a valve timing control section and a start control section. The motor control section is configured to operate an electric motor to crank an engine with an output of the electric motor being adjustable. The valve timing control section is configured to operate a variable valve operating mechanism when the engine is started to change at least a close timing of an intake valve of the engine from an initial timing corresponding to a state in which the engine is stopped to a start timing for starting the engine. The valve timing control section operates the variable valve operating mechanism to set the close timing of the intake valve such that the start timing is set to be closer to an intake bottom dead center during a single engine start as compared to the initial timing. The start control section is configured to adjust the output of the electric motor as the close timing of the intake valve changes from the initial timing to the start timing during the single engine start.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 9A is a schematic diagram illustrating a change in the open/close timing of the intake valve in accordance with a first modified embodiment of the present invention;

FIG. 9B is a simplified diagram illustrating the relationships among the open/close timing of the intake valve, the motor torque and the engine torque in accordance with the first modified embodiment of the present invention;

FIG. 10A is a schematic diagram illustrating a change in the open/close timing of the intake valve in accordance with a second modified embodiment of the present invention; and FIG. 10B is a simplified diagram illustrating the relationships among the open/close timing of the intake valve, the motor torque and the engine torque in accordance with the second modified embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
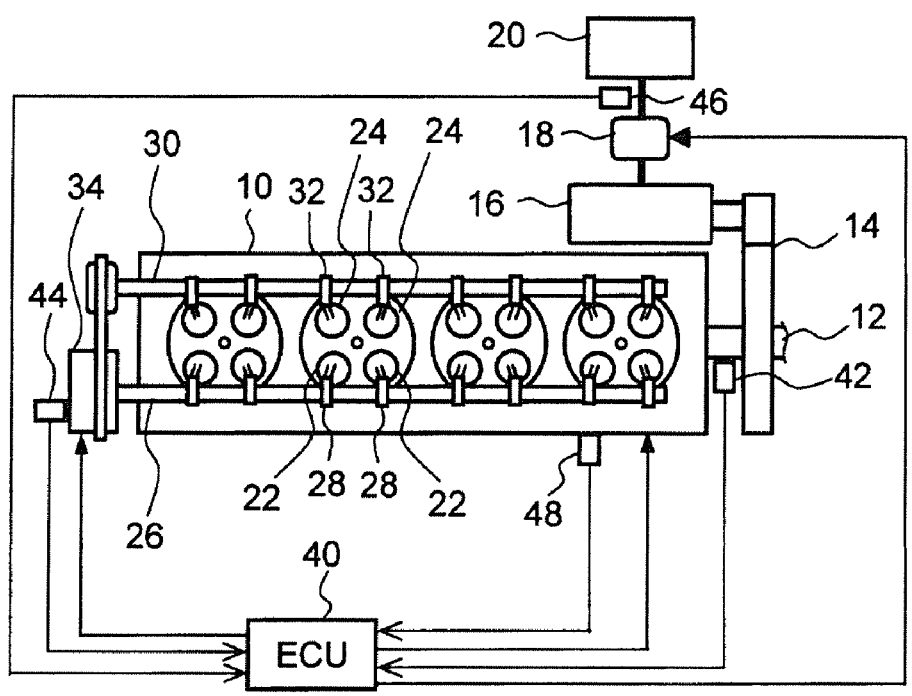
FIG. 1 is a schematic view of an engine provided with an engine starting control apparatus in accordance with an embodiment of the present invention.

Referring initially to FIG. 1, an engine 10 provided with an engine starting control apparatus in accordance with one embodiment of the present invention is illustrated. As shown in FIG. 1, the engine 10 includes a crankshaft 12 that is connected to an electric motor 16 through a power transmitting mechanism 14 comprising some gears. The electric motor 16 is connected to a battery 20 through a voltage varying device 18. The electric motor 16 is configured and arranged to be driven to crank the engine 10 when the engine 10 is started. The voltage varying device 18 is configured and arranged to adjust the output of the electric motor 16 by varying the voltage supplied to the electric motor 16 from the battery 20. In other words, the electric motor 16 is arranged such that the output from the electric motor 16 is adjustable to an output value ranging from a minimum output to a maximum output of the electric motor 16 by varying the voltage supplied to the voltage varying device 18.

The engine 10 has a plurality of intake valves 22 and a plurality of exhaust valves 24 as shown in FIG. 1. Each of the intake valves 22 is coupled to an intake cam 28. The intake cams 28 are coupled to an intake camshaft 26 that is arranged to rotate in coordination with the crankshaft 12. Thus, the intake valves 22 are opened and closed by the intake cams 28 as the intake camshaft 26 rotates. Similarly, each of the exhaust valves 24 is coupled to an exhaust cam 32. The exhaust cams 32 are coupled to an exhaust camshaft 30 that is arranged to rotate in coordination with the crankshaft 12. Thus, the exhaust valves 24 are opened and closed by the exhaust cams 32 as the exhaust camshaft 30 rotates.

The engine 10 also includes a valve timing control device (VTC) 34 serving as a variable valve operating mechanism. The VTC 34 is mounted to one end of the intake camshaft 26 (leftward end in FIG. 1). In this illustrated embodiment, the VTC 34 is preferably configured and arranged to vary the open/close timing (i.e., both the open timing and the close timing) of the intake valves 22 by changing the rotational phase of the intake camshaft 26 with respect to the crankshaft 12. This type of VTC 34 is well-known in the art. For example, Japanese Laid-Open Patent Publication No. 2005-240768 discloses this type of VTC. Since the VTC 34 is well known in the art, the structure thereof will not be discussed or illustrated in detail herein. Rather, it will be apparent to those skilled in the art from this disclosure that the components can be any type of structure and/or programming that can be used to carry out the present invention.

The engine 10 further includes an electronic control unit (ECU) 40. The ECU 40 is configured to determine the engine operating conditions based on input signals from various sensors to control the operation of the engine 10, the voltage varying device 18 (electric motor 16), and the VTC 34 accordingly. In particular, when the engine 10 is started, the ECU 40 is configured to control the voltage varying device 18 such that a prescribed voltage is supplied to the electric motor 16 to crank the engine 10. At the same time, the ECU 40 is configured to control the VTC 34 such that the open/close timing of the intake valves 22 is adjusted to a timing (start timing) suited to starting the engine 10.

The ECU 40 preferably includes a microcomputer with an engine starting control program that controls the operation of the engine 10, the voltage varying device 18, and the VTC 34 as discussed below. The ECU 40 can also include other conventional components such as an input interface circuit, an output interface circuit, and storage devices such as a ROM (Read Only Memory) device and a RAM (Random Access Memory) device. The memory circuit stores processing results and control programs that are run by the processor circuit. The ECU 40 is operatively coupled to the various components of the engine 10 in a conventional manner. The internal RAM of the ECU 40 stores statuses of operational flags and various control data. The internal ROM of the ECU 40 stores the preset map and data for various operations. The ECU 40 is capable of selectively controlling any of the components of the control system in accordance with the control program. It will be apparent to those skilled in the art from this disclosure that the precise structure and algorithms for the ECU 40 can be any combination of hardware and software that will carry out the functions of the present invention. The ECU 40 preferably constitutes a controller including a motor control section, a valve timing control section and a start control section in accordance with the illustrated embodiment of the present invention.

The input signals fed to the ECU 40 include a detection signal from an air flow meter (not shown) configured and arranged to detect an intake air flow rate, a detection signal from a throttle sensor (not shown) configured and arranged to detect a throttle opening degree, a detection signal from an accelerator sensor (not shown) configured and arranged to detect an accelerator operation amount, a detection signal from a crank sensor 42 (crank angle detecting section) configured and arranged to detect a rotational angle of the crankshaft 12, a detection signal from a cam sensor 44 (cam angle detecting section) configured and arranged to detect a rotational angle of the intake camshaft 26, a detection signal from a battery sensor 46 configured and arranged to detect a voltage or current of the battery 20, a detection signal from a coolant temperature sensor 48 configured and arranged to detect a temperature of an engine coolant, and on-off signals from such switches as an ignition key switch and an idle switch.

The ECU 40 is configured to calculate an engine speed Ne based on the detection signal from the crank sensor 42 (e.g., based on a reference frequency of the crank angle signal). The ECU 40 is configured to detect the open/close timing of the intake valves 22 as a rotational phase of the intake camshaft 26 with respect to the crankshaft 12 based on the detection signals from the crank sensor 42 and the cam sensor 44. Of course, it will be apparent to those skilled in the art from this disclosure that the invention is not limited to determining the engine speed Ne and the open/close timing of the intake valves 22 based on the input signals mentioned here. It is acceptable to determine (i.e., detect or estimate) the engine speed Ne and the open/close timing of the intake valves 22 based on input signals from other sensors.

The engine starting control executed by the ECU 40 in the illustrated embodiment will now be explained.

In the engine starting control of the illustrated embodiment, the ECU 40 is configured to operate the electric motor 16 to crank the engine 10 when the engine 10 is started. The ECU 40 is also configured to operate the VTC 34 to change the open/close timing of the intake valves 22 from a timing (initial timing) corresponding to an initial state in which the engine 10 is stopped to the start timing that is suitable for starting the engine 10. During the cranking of the engine 10, the open/close timing of the intake valves 22 is detected as the open/close timing changes from the initial timing to the start timing, and the torque of the electric motor 16 is controlled based on the detected open/close timing.

When the VTC 34 is used as the variable valve operating mechanism as in the illustrated embodiment, the open/close timing of the intake valves 22 is generally set to a maximally retarded timing, i.e., the most retarded timing possible, when the engine 10 is stopped (i.e., in an initial state of the starting process). Thus, in the illustrated embodiment, the initial timing of the open/close timing of the intake valves 22 is defined as the most retarded timing of the open/close timing of the intake valves 22. With the most retarded timing, the close timing (IVC) of the intake valves 22 is greatly retarded relative to the bottom dead center (BDC) position of the intake stroke (i.e., intake bottom dead center) and the engine torque produced by the ignition of fuel is small. By controlling the timing of the intake valves 22 to the start timing (i.e., the timing suitable for starting the engine 10), the open/close timing of the intake valves 22 is advanced closer to BDC, and thus, the engine torque increases. Thus, as the open/close timing of the intake valves 22 approaches the start timing, a state is achieved in which a prescribed cranking rotational speed is maintained even if the torque of the electric motor 16 is reduced. Therefore, in the illustrated embodiment of the present invention, the electric motor 16 is controlled to output only the amount of torque necessary to maintain the prescribed cranking rotational speed in conjunction with the engine torque by controlling the torque of the electric motor 16 based on the open/close timing of the intake valves 22. Accordingly, the electric power consumption (battery consumption) of the electric motor 16 can be suppressed.

Figure 2:
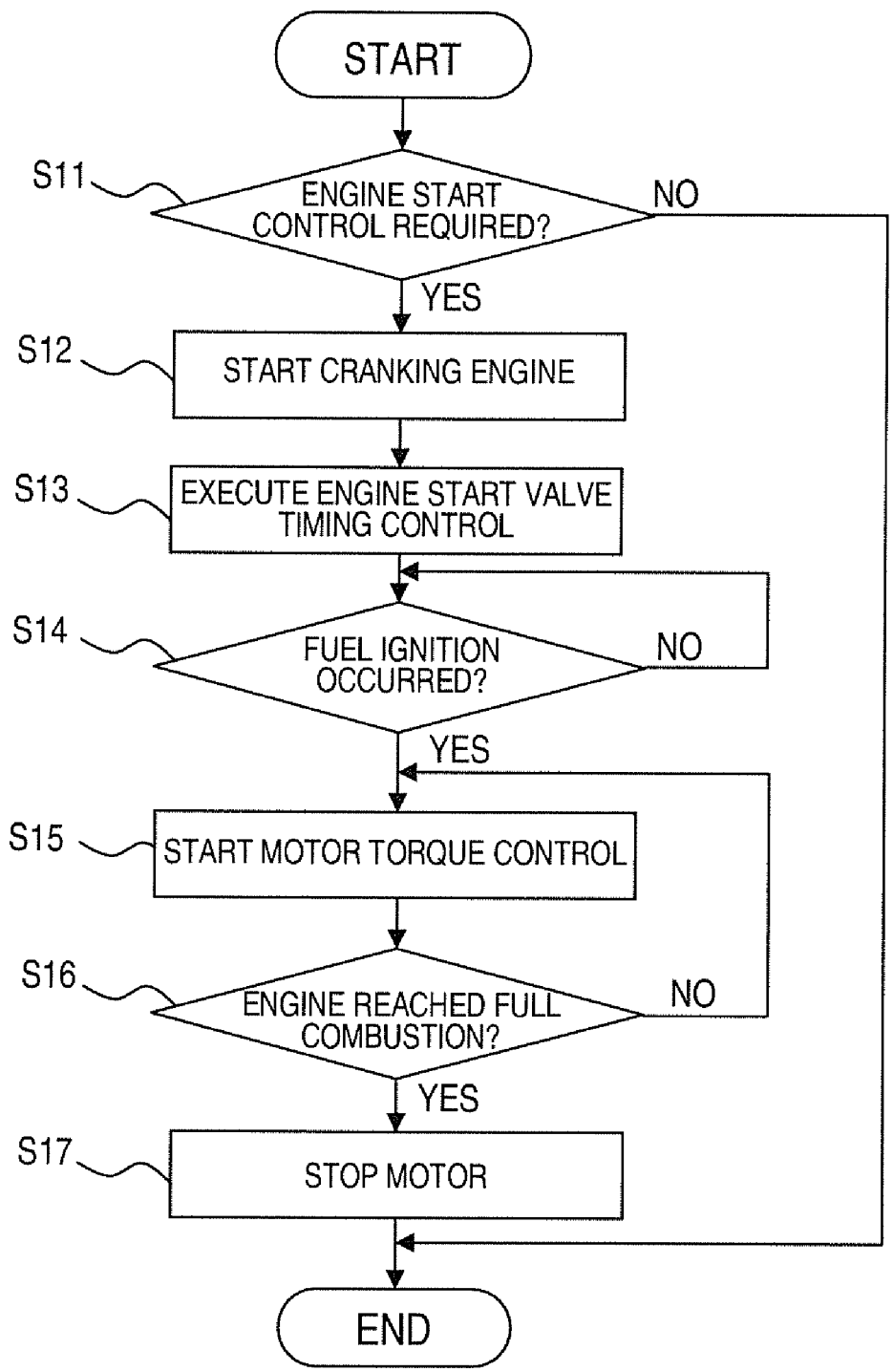
FIG. 2 is a flowchart showing a start control executed by the engine starting control apparatus in accordance with the illustrated embodiment of the present invention.

FIG. 2 is a flowchart showing the engine starting control executed by the ECU 40 in accordance with the illustrated embodiment.

In step S11 of the flowchart shown in FIG. 2, the ECU 40 is configured to determine if the engine starting control is required to be commenced. This determination is accomplished based on, for example, the state of the on-off signal of the ignition key switch. If the ignition key switch is on in step S11 (Yes in step S11), then the ECU 40 determines that the start control is required to be commenced and proceeds to step S12.

In step S12, the ECU 40 is configured to start cranking the engine 10. In other words, the ECU 40 is configured to control the voltage varying device 18 such that a prescribed voltage is supplied to the electric motor 16 to drive the electric motor 16 with a constant output. The prescribed voltage is a voltage value sufficient to produce a torque that is at least large enough to balance against the friction torque that exists at a target cranking rotational speed. The prescribed voltage is set, for example, in accordance with the engine coolant temperature Tw. Furthermore, the target cranking rotational speed is an engine speed at which the engine 10 can reliably accomplish ignition and combustion. For example, the target cranking rotational speed can be set based on an ignition characteristic of the engine 10 by referring to a map such as the one shown in FIG. 3 so as to achieve an engine speed at which the compression temperature inside the cylinder reaches or exceeds a prescribed temperature. As a result, the engine speed (cranking rotational speed) approaches the target cranking rotational speed. The operation executed in step S12 corresponds to the motor control section of the illustrated embodiment of the present invention.

In step S13, the ECU 40 is configured to execute an engine start valve timing control. In other words, the ECU 40 is configured to operate the VTC 34 such that the open/close timing of the intake valves 22 is controlled from the most retarded timing (initial timing) corresponding to a state in which the engine 10 is stopped to the start timing. The operation executed in step S13 corresponds to the valve timing control section of the illustrated embodiment of the present invention.

When the engine start valve timing control commences, the open/close timing of the intake valves 22 does not normally reach the start timing right away. Instead, the open/close timing of the intake valves 22 gradually changes toward the start timing. During the period when the intake valve open/close timing is changing, the electric power consumed by the electric motor 16 will be large if the engine 10 is cranked by the electric motor 16 alone. Moreover, if the VTC 34 is hydraulically driven, then the amount of time required for the open/close timing of the intake valves 22 to reach the start timing will be longer when the temperature is low because it takes time for the hydraulic pressure to rise at low temperatures. Additionally, since the friction of the engine 10 increases at low temperatures, the electric power consumption of the electric motor 16 will be higher and there will be the possibility that the power of the battery 20 will become insufficient when the temperature is low. One way to prevent the power of the battery 20 from becoming insufficient is to increase the size of the battery, but there are many cases in which layout considerations prohibit increasing the size of the battery 20. Moreover, increasing the size of the battery 20 increases the cost.

On the other hand, since the engine 10 produces torque when fuel ignition occurs, the target cranking rotational speed can be maintained after fuel ignition begins even if the torque of the electric motor 16 is lowered by an amount corresponding to the engine torque produced due to the fuel combustion. The torque produced by the engine 10 changes (increases) in accordance with a change in the open/close timing of the intake valves 22.

Therefore, in the illustrated embodiment, the ECU 40 is configured to detect an occurrence of fuel ignition in the engine 10, and to control the torque of the electric motor 16 in accordance with the actual open/close timing of the intake valves 22 after fuel ignition occurs in order to suppress the electric power consumption of the electric motor 16.

Figure 3:
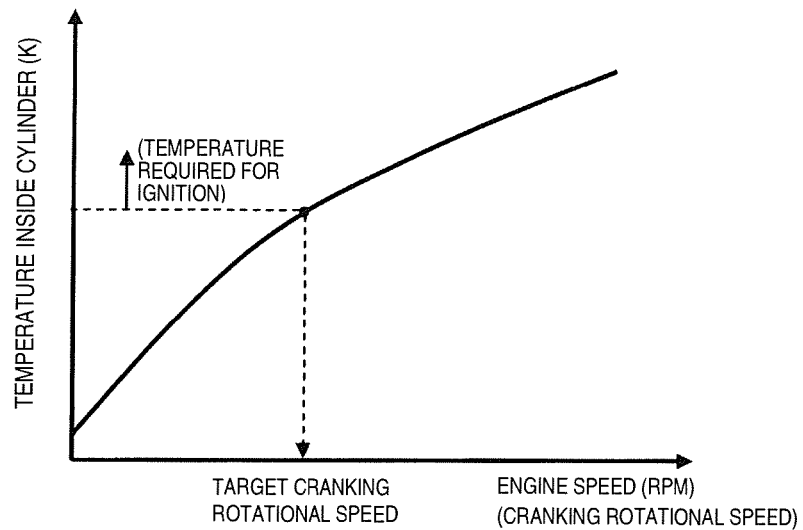
FIG. 3 is a simplified diagram illustrating an example of how a target cranking rotational speed is set in the engine starting control apparatus in accordance with the illustrated embodiment of the present invention.

Accordingly, in step S14, the ECU 40 is configured to determine if fuel ignition has occurred in the engine 10. The determination executed in step S14 regarding ignition is accomplished by, for example, determining if the engine speed has reached the target cranking rotational speed. As explained previously, the target cranking rotational speed is set based on the ignition and combustion characteristics of the engine 10 as shown in FIG. 3. Thus, when the engine 10 reaches the target cranking rotational speed, it is reasonable to assume that the engine 10 has achieved ignition of the fuel. Thus, if the engine speed has reached the target cranking rotational speed, then the ECU 40 determines that the engine 10 is igniting the fuel and proceeds to step S15. If the engine speed is lower than the target cranking rotational speed, then the ECU 40 continues operating the electric motor 16 at the constant output torque.

Alternatively, in order to determine the occurrence of fuel ignition more accurately, it is acceptable to set an ignition determining rotational speed as a threshold speed that is separate from the target cranking rotational speed. For example, it is feasible to set the ignition determining rotational speed to a value 5 to 10% larger than the target cranking rotational speed. It is also acceptable to determine if ignition is occurring based on parameters other than the engine speed. For example, the temperature and pressure inside the cylinders of the engine 10 can be detected (or estimated) and the ignition determination can be accomplished based on the detected (or estimated) temperature and pressure inside the cylinders.

In step S15, the ECU 40 is configured to start a torque control (motor torque control) of the electric motor 16. In other words, the ECU 40 is configured to detect the open/close timing of the intake valves 22 based on the detection signals from the crank sensor 42 and the cam sensor 44. The ECU 40 is then configured to control the output (torque) of the electric motor 16 based on the detected open/close timing. The operation executed in step S15 corresponds to the start control section of the illustrated embodiment of the present invention.

Alternatively, since the open/close timing of the intake valves 22 and the center phase of the operating angle (i.e., a duration between the open timing and the close timing in terms of the crank angle) of the intake valves 22 change in synchronization with each other, it is acceptable to estimate the open/close timing of the intake valves 22 by detecting the center phase of operation angle of the intake valves 22 and to control the output of the electric motor 16 based on the estimated open/close timing of the intake valves 22.

Figure 4:
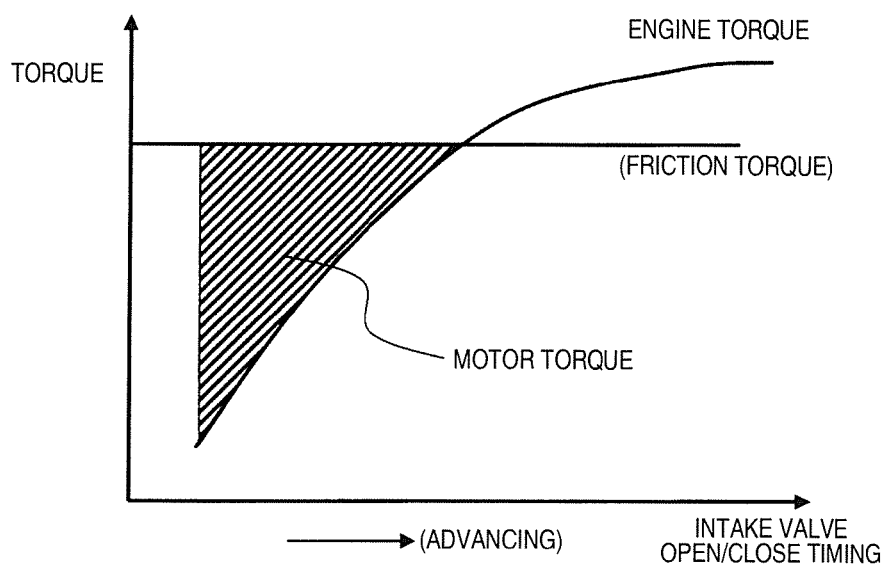
FIG. 4 is a simplified diagram illustrating the relationships among a open/close timing of intake valves, an engine torque, and a motor torque during cranking at the target cranking rotational speed in accordance with the illustrated embodiment of the present invention.

As explained previously, ignition of the fuel causes the engine 10 to produce torque and the engine torque produced by the fuel ignition increases as the open/close timing of the intake valves 22 approaches the start timing. Thus, as shown in FIG. 4, as the open/close timing of the intake valves 22 draws closer to the start timing (i.e., as the open/close timing advances in the illustrated embodiment), less torque is required from the electric motor 16 in order to maintain the target cranking rotational speed. In other words, the torque that the electric motor 16 needs to generate during cranking at the target cranking rotational speed decreases as the open/close timing of the intake valves 22 advances.

Figure 5:
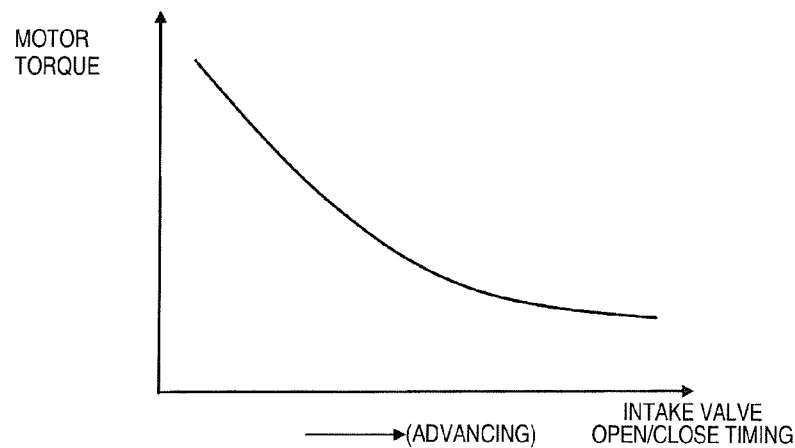
FIG. 5 is a simplified diagram illustrating an example of a conversion table of the motor torque versus the open/close timing of the intake valves used by the engine starting control apparatus in accordance with the illustrated embodiment of the present invention.

Therefore, in the illustrated embodiment of the present invention, a table plotting the motor torque versus the valve timing (intake valve open/close timing) such as the one shown in FIG. 5 is prepared in advance. The ECU 40 is configured to determine the motor torque based on the actual open/close timing of the intake valves 22 detected based on the detection signals from the crank sensor 42 and the cam sensor 44 by referring to the table such as the one shown in FIG. 5. During the remaining period when the engine 10 is being cranked at the target cranking rotational speed, the ECU 40 is configured to control the electric motor 16 to output the motor torque according to the table such as the one shown in FIG. 5. More specifically, the output of the electric motor 16 is controlled by controlling the voltage supplied to the electric motor 16 using the voltage varying device 18. As a result, after fuel ignition started in the engine 10, the torque of the electric motor 16 decreases as the open/close timing of the intake valves 22 approaches (advances toward) the start timing, and the rotational speed of engine 10 is held at the target cranking rotational speed by both torque from the electric motor 16 and torque produced by the engine 10 due to fuel combustion.

In step S16, the ECU 40 is configured to determine if full combustion has been achieved in the engine 10. The determination regarding full combustion is made, for example, by determining if the engine speed Ne has reached a preset full combustion determining rotational speed (which is larger than the target cranking rotational speed). When the engine speed Ne has reached the full combustion determining rotational speed, the open/close timing of the intake valves 22 is at the start timing and it is feasible to assume that the engine 10 is producing a sufficient amount of torque. If the engine speed Ne is equal to or larger than the full combustion determining rotational speed in step S16, then the ECU 40 proceeds to step S17. If the engine speed Ne is not equal to or larger than the full combustion determining rotational speed in step S16, then the ECU 40 continues the torque control of the electric motor 16.

The full combustion determination is not limited to this method explained herein. It is also acceptable to detect (or estimate) the temperature and pressure inside the cylinders of the engine 10 and determine if full combustion has been achieved based on the detected (or estimated) temperature and pressure inside the cylinders.

In step S17, the ECU 40 is configured to stop the electric motor 16. Then, the ECU 40 ends the engine starting control.

Figure 6:
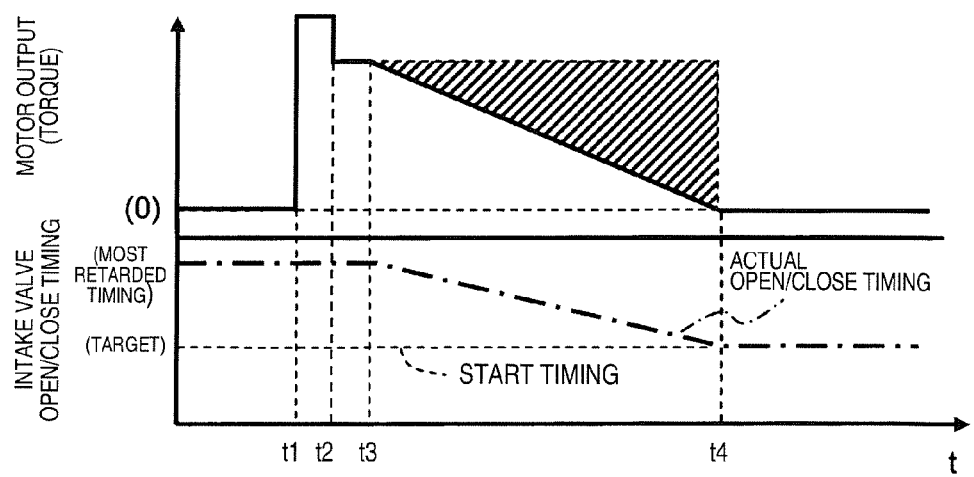
FIG. 6 is a time chart illustrating the start control executed by the engine starting control apparatus in accordance with the illustrated embodiment of the present invention.

FIG. 6 is a time chart for the engine starting control in accordance with the illustrated embodiment.

When the engine starting control begins, the prescribed voltage is supplied to the electric motor 16 from the voltage varying device 18 and the electric motor 16 is operated at constant output to start cranking the engine 10 (time t1). When cranking commences, the VTC 34 is driven and the open/close timing of the intake valves 22 is controlled to change from the initial timing (the most retarded timing corresponding to when the engine 10 is stopped) to the start timing. However, if the temperature is low such that the friction is large and if the VTC 34 is a hydraulically driven valve timing control device, then it will take time for the hydraulic pressure to rise and the open/close timing of the intake valves 22 will not reach the start timing immediately. When fuel ignition starts to occur in the engine 10, the ECU 40 is configured to start the torque control (motor torque control) of the electric motor 16 (time t2). Since ignition of fuel causes the engine 10 to produce a torque, after fuel ignition occurred at time t2, the torque of the electric motor 16 is decreased by the amount of engine torque produced. When the VTC 34 has been driven long enough for the hydraulic pressure to rise, the open/close timing of the intake valves 22 starts to change from the most retarded timing towards the start timing (time t3).

The engine torque resulting from the fuel ignition in the engine 10 increases as the open/close timing of the intake valves 22 approaches the start timing (i.e., advances toward the start timing in the illustrated embodiment). By controlling the voltage supplied to the electric motor 16 (i.e., decreasing the output of the electric motor 16) in accordance with the (actual) open/close timing of the intake valves 22, the torque of the electric motor 16 is decreased as the engine torque increases. When the engine 10 reaches full combustion, the electric motor 16 is stopped (time t4). As a result, an amount of electric power (torque) corresponding to the hatched region shown in FIG. 6 is conserved during engine cranking in the illustrated embodiment as compared to when the output of the electric motor 16 is maintained at constant output.

FIG. 6 illustrates an example in which the point in time when the electric motor 16 is stopped is coincident with the point in time when the open/close timing of the intake valves 22 reaches the start timing (i.e., both occur at the time t4). In other words, the electric motor 16 is stopped when the open/close timing of the intake valves 22 reaches the start timing. However, the invention is not limited to stopping the electric motor 16 when the open/close timing of the intake valves 22 reaches the start timing. More specifically, as explained above with reference to the flowchart of FIG. 2, the electric motor 16 can be stopped when it is determined that the engine 10 has achieved full combustion.

The effects that can be obtained with the engine starting control apparatus in accordance with the illustrated embodiment will now be explained.

The ECU 40 of the illustrated embodiment is configured to control the open/close timing of the intake valves 22 of the engine 10 to the start timing suited for starting the engine 10 when the engine 10 is started. In the illustrated embodiment, the open/close timing of the intake valves 22 is detected and the torque of the electric motor 16 is controlled based on the detected open/close timing. In this way, the torque of the electric motor 16 can be decreased in accordance with the change (increase) in engine torque that results from changing the open/close timing of the intake valves 22. As a result, the target cranking rotational speed can be sustained without the electric motor 16 consuming an excessive amount of electric power, and thus, a situation in which the electric power of the battery 20 becomes insufficient can be prevented. This result enables cranking to be executed for a longer period of time without requiring a large size of the battery 20 and enables stable engine starting to be accomplished under low temperature conditions.

Figure 7:
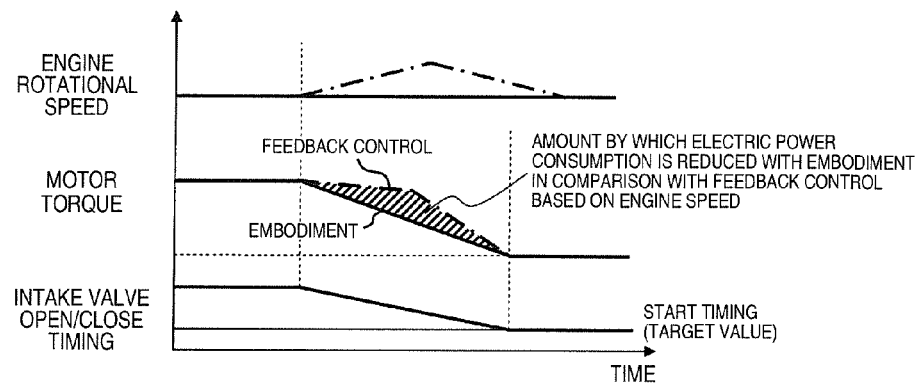
FIG. 7 is a time chart for explaining the effects obtained by the engine starting control apparatus in accordance with the illustrated embodiment of the present invention.

Since the torque of the electric motor 16 is controlled based on the open/close timing of the intake valves 22, the output of the electric motor 16 (i.e., the voltage supplied to the electric motor 16) can be optimized more quickly and the electric power consumption can be suppressed more effectively. Since the engine speed (cranking rotational speed) also increases as the engine torque increases, it would seem feasible to use feedback control based on the engine speed. However, as shown in FIG. 7, controlling the torque of the electric motor 16 based on the open/close timing of the intake valves 22 in accordance with the illustrated embodiment (indicated with solid line) enables the motor torque to respond more quickly to the increase in the engine torque than using feedback control of the motor torque based on the engine speed (indicated with single-dot chain line). More specifically, when the motor torque is controlled with feedback control based on the engine rotational speed, the output of the electric motor 16 is controlled after the engine speed increases. Consequently, there is a delay in the motor torque control when the feedback control is executed based on the engine speed, and thus, the electric power consumption becomes larger as compared to the engine starting control of the illustrated embodiment by an amount corresponding to the torque region indicated with hatching in FIG. 7. Thus, since the output of the electric motor 16 can be controlled before the engine speed actually rises in the illustrated embodiment, the engine starting control of the illustrated embodiment is superior to feedback control based on the engine speed from the standpoint of reducing the electric power consumption of the electric motor 16 as shown in FIG. 7.

Figures 8A, 8B:
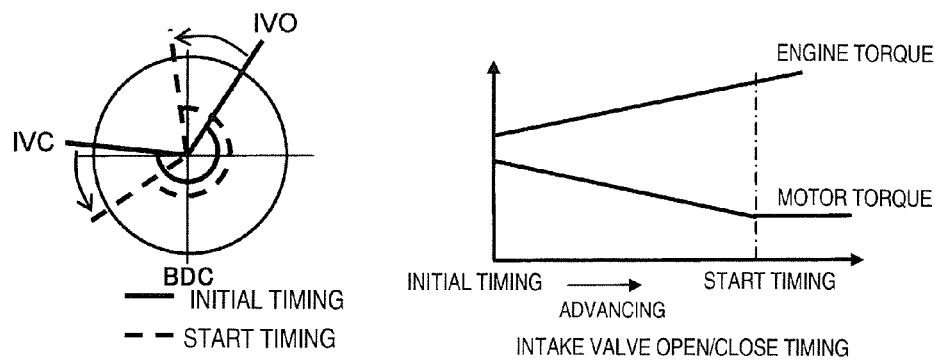
FIG. 8A is a schematic diagram illustrating a change in the open/close timing of the intake valves in accordance with the illustrated embodiment of the present invention.
FIG. 8B is a simplified diagram illustrating the relationships among the open/close timing of the intake valve, the motor torque and the engine torque in accordance with the illustrated embodiment of the present invention.

In the illustrated embodiment explained above, the open/close timing of the intake valves 22 is changed by changing the rotational phase of the intake camshaft 26 with respect to the crankshaft 12. More specifically, as seen in the open/close timing diagram in FIG. 8A in accordance with the illustrated embodiment, the initial timing of the open/close timing of the intake valves 22 is set to the most retarded timing and both the open timing (IVO) and the close timing (IVC) of the intake valves 22 are advanced from the initial timing (the most retarded timing) shown in the solid lines in FIG. 8A to the start timing shown in the dotted lines in FIG. 8A. At the initial timing, the intake valve close timing (IVC) is greatly retarded with respect to bottom dead center (BDC) as shown in FIG. 8A, and thus, the engine torque is small as shown in FIG. 8B. As the close timing (IVC) of the intake valves 22 advances toward bottom dead center, the engine torque increases as shown in FIG. 8B. Thus, in the illustrated embodiment, as shown in FIG. 8B, the ECU 40 is configured to decrease the torque of the electric motor 16 as the open/close timing of the intake valves 22 advances.

However, the present invention is not limited to changing the open/close timing of the intake valves 22 as illustrated in FIGS. 8A and 8B. In other words, the engine starting control apparatus in accordance with the present invention can be carried out so long as at least the close timing of the intake valves 22 of the engine 10 is controlled to a start timing suited for starting the engine 10 when the engine 10 is started, and so long as the valve timing control is accompanied by a control of the torque (output) of the electric motor 16.

For example, FIGS. 9A and 9B illustrate a first modified embodiment in which the VTC 34 (variable valve operating mechanism) is configured and arranged to change the close timing of the intake valves 22 by changing the amount of valve lift and the operating angle of the intake valves 22. In the first modified embodiment illustrated in FIGS. 9A and 9B, the initial state timing is defined as a timing where the valve lift amount and the operating angle of the intake valves 22 are the smallest as shown in the solid lines in FIG. 9A. In the initial state, the close timing of the intake valve (IVC) is greatly advanced with respect to bottom dead center (BDC) of the intake stroke. As the valve lift amount and the operating angle increase, the intake valve close timing (IVC) is retarded until it reaches the start timing in the vicinity of bottom dead center. At the initial timing, the intake valve close timing (IVC) is greatly advanced with respect to bottom dead center, and thus, the engine torque is small as shown in FIG. 9B. As the valve lift amount and the operating angle of the intake valves 22 are increased, the intake valve close timing (IVC) retards toward bottom dead center, and thus, the engine torque increases as shown in FIG. 9B. Thus, with the first modified embodiment, as shown in FIG. 9B, the ECU 40 is configured to decrease the torque of the electric motor 16 as the valve lift amount and the operating angle increase.

On the other hand, FIGS. 10A and 10B illustrate a second modified embodiment in which the VTC 34 (variable valve operating mechanism) is configured and arranged to change the close timing of the intake valves 22 by changing the amount of valve lift and the operating angle of the intake valves 22. In the second modified embodiment, the initial timing is defined as the timing where the valve lift and the operating angle of the intake valves 22 are the largest. In the initial state, the close timing of the intake valve (IVC) is retarded with respect to bottom dead center (BDC) as shown in the solid lines in FIG. 10A. As the valve lift amount and the operating angle decrease, the intake valve close timing is advanced until it reaches a start timing in the vicinity of bottom dead center as shown in the dotted lines in FIG. 10A. At the initial timing, the close timing (IVC) of the intake valves 22 is greatly retarded with respect to bottom dead center, and thus, the engine torque is small as shown in FIG. 10B. As the valve lift amount and the operating angle are decreased, the intake valve close timing advances toward bottom dead center, and thus, the engine torque increases as shown in FIG. 10A. Thus, with the second modified embodiment, as shown in FIG. 10B, the ECU 40 is configured to decrease the torque of the electric motor 16 as the valve lift amount and operating angle decrease.

In the embodiments described above, the open/close timing of the intake valves 22 is detected based on the detection signals from the crank sensor 42 and the cam sensor 44, and the output (torque) of the electric motor 16 is controlled based on the detected open/close timing of the intake valves 22. However, the present invention is not limited to such an arrangement. For example, since the engine start valve timing control causes the open/close timing of the intake valves 22 change gradually from the initial timing to the start timing over time, it is possible to control the output of the electric motor 16 based on the amount of time elapsed since the engine start valve timing control commenced.

Additionally, although the variable valve operating mechanisms (VTC 34) presented in the embodiments described heretofore are configured to change both the open timing and the close timing of the intake valves 22, it is also feasible to employ a variable valve operating mechanism that changes only the close timing of the intake valves 22.

With the illustrated embodiments of the present invention, the electric motor 16 cranks the engine 10 when the engine 10 is started and the output of the electric motor 16 is changed as the open/closing timing of the intake valves 22 changes. The output torque of the electric motor 16 is varied in accordance with the change in the engine torque that accompanies the change in the open/close timing of the intake valves 22, and thus, the output torque of the electric motor 16 does not become excessively insufficient. As a result, the target cranking rotational speed can be maintained while suppressing the electric power consumed by the electric motor 16 as much as possible, thereby preventing the electric power of the battery 20 from becoming insufficient. This result enables cranking to be executed for a longer period of time without requiring a larger battery and enables stable starting to be accomplished under low temperature conditions.

Moreover, compared to other control schemes, e.g., changing the output of the electric motor based on the engine speed, changing the output of the electric motor 16 based on the open/close timing of the intake valves 22 as in the illustrated embodiments enables the output of the electric motor 16 to be optimized more quickly and the power consumed by the electric motor 16 to be suppressed more effectively.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine starting control apparatus comprising:
   a motor control section configured to operate an electric motor to crank an engine with an output of the electric motor being adjustable;
   a valve timing control section configured to operate a variable valve operating mechanism when the engine is started to change at least a close timing of an intake valve of the engine from an initial timing corresponding to a state in which the engine is stopped to a start timing for starting the engine, the valve timing control section operating the variable valve operating mechanism to set the close timing of the intake valve such that the start timing is set to be closer to an intake bottom dead center during a single engine start as compared to the initial timing; and
   a start control section configured to continuously decrease the output of the electric motor as the close timing of the intake valve draws closer to the start timing from the initial timing during the single engine start.

2. The engine starting control apparatus as recited in claim 1, wherein
   the start control section is further configured to determine the close timing of the intake valve, and to decrease the output of the electric motor based on the close timing of the intake valve determined.

3. The engine starting control apparatus as recited in claim 1, wherein
   the start control section is further configured to decrease the output of the electric motor after an occurrence of fuel ignition in the engine is detected.

4. The engine starting control apparatus as recited in claim 1, wherein
   the start control section is further configured to decrease the output of the electric motor such that a cranking rotational speed of the engine is maintained at a prescribed rotational speed.

5. The engine starting control apparatus as recited in claim 1, wherein the start control section is further configured to decrease the output of the electric motor by varying a voltage supplied to the electric motor.

6. The engine starting control apparatus as recited in claim 2, further comprising
   a crank angle detecting section configured and arranged to detect a rotational angle of a crankshaft of the engine, and a cam angle detecting section configured and arranged to detect a rotational angle of an intake camshaft of the engine, the start control section being further configured to determine the close timing of the intake valve based on detection results from the crank angle detecting section and the cam angle detecting section.

7. The engine starting control apparatus as recited in claim 1, wherein the start control section is further configured to decrease the output of the electric motor based on an amount of time elapsed since the valve timing control section started operating the variable valve operating mechanism to change the close timing of the intake valve from the initial timing to the start timing.

8. The engine starting control apparatus as recited in claim 1, wherein the valve timing control section is further configured to operate the variable valve operating mechanism to change the close timing from the initial timing to the start timing by changing a valve lift amount and an operation angle of the intake valve.

9. The engine starting control apparatus as recited in claim 8, wherein the start control section is further configured to decrease the output of the electric motor as the valve lift amount and the operation angle of the intake valve increase.

10. The engine starting control apparatus as recited in claim 8, wherein the start control section is further configured to decrease the output of the electric motor as the valve lift amount and the operation angle of the intake valve decrease.

11. The engine starting control apparatus as recited in claim 1, wherein the start control section is further configured to maintain the output of the electric motor at a constant output until an occurrence of fuel ignition in the engine is detected, and to decrease the output of the electric motor according to a change in the close timing of the intake valve after the occurrence of fuel ignition in the engine is detected.

12. An engine starting control apparatus comprising:

a motor control section configured to operate an electric motor to crank an engine with an output of the electric motor being adjustable;

a valve timing control section configured to operate a variable valve operating mechanism when the engine is started to change at least a close timing of an intake valve of the engine from an initial timing corresponding to a state in which the engine is stopped to a start timing for starting the engine, the valve timing control section operating the variable valve operating mechanism to set the close timing of the intake valve such that the start timing is set to be closer to an intake bottom dead center during a single engine start as compared to the initial timing; and a start control section configured to adjust the output of the electric motor as the close timing of the intake valve changes from the initial timing to the start timing during the single engine start, the start control section further adjusting the output of the electric motor by an adjustment value after the engine has been started and during the time before perfect combustion has been achieved, the adjustment value being equal to an amount corresponding to engine torque produced by initial fuel combustion.

13. An engine starting control method comprising:

operating an electric motor to crank an engine with an output of the electric motor being adjustable;

changing at least a close timing of an intake valve of the engine from an initial timing corresponding to a state in which the engine is stopped to a start timing for starting the engine when the engine is started, such that the start timing is closer to an intake bottom dead center during a single engine start as compared to the initial timing; and decreasing continuously the output of the electric motor as the close timing of the intake valve draws closer to the start timing from the initial timing during the single engine start.

14. An engine starting system comprising:

an electric motor configured to crank an engine with an output of the electric motor being adjustable;

a variable valve control mechanism configured to control an intake valve of the engine; and a controller including a motor control section configured to operate the electric motor to crank the engine when the engine is started, a valve timing control section configured to operate the variable valve control mechanism when the engine is started to change at least a close timing of the intake valve from an initial timing corresponding to a state in which the engine is stopped to a start timing for starting the engine, the valve timing control section operating the variable valve control mechanism to set the close timing of the intake valve such that the start timing is set to be closer to an intake bottom dead center during a single engine start as compared to the initial timing, and a start control section configured to continuously decrease the output of the electric motor as the close timing of the intake valve draws closer to the start timing from the initial timing during the single engine start.

15. An engine starting system comprising:

an electric motor configured to crank an engine with an output of the electric motor being adjustable;

a variable valve control mechanism configured to control an intake valve of the engine; and a controller including a motor control section configured to operate the electric motor to crank the engine when the engine is started, a valve timing control section configured to operate the variable valve control mechanism when the engine is started to change at least a close timing of the intake valve from an initial timing corresponding to a state in which the engine is stopped to a start timing for starting the engine, the valve timing control section operating the variable valve control mechanism to set the close timing of the intake valve such that the start timing is set to be closer to an intake bottom dead center during a single engine start as compared to the initial timing, and a start control section configured to adjust the output of the electric motor as the close timing of the intake valve changes from the initial timing to the start timing during the single engine start, the start control section further adjusting the output of the electric motor by an adjustment value after the engine has been started and during the time before perfect combustion has been achieved, the adjustment value being equal to an amount corresponding to engine torque produced by initial fuel combustion.

* * * * *